Aug. 26, 1924. 1,506,157
G. C. BRAINARD
PRESSED STEEL SPRING HANGER FOR AUTOMOBILE FRAMES
Original Filed April 3, 1919
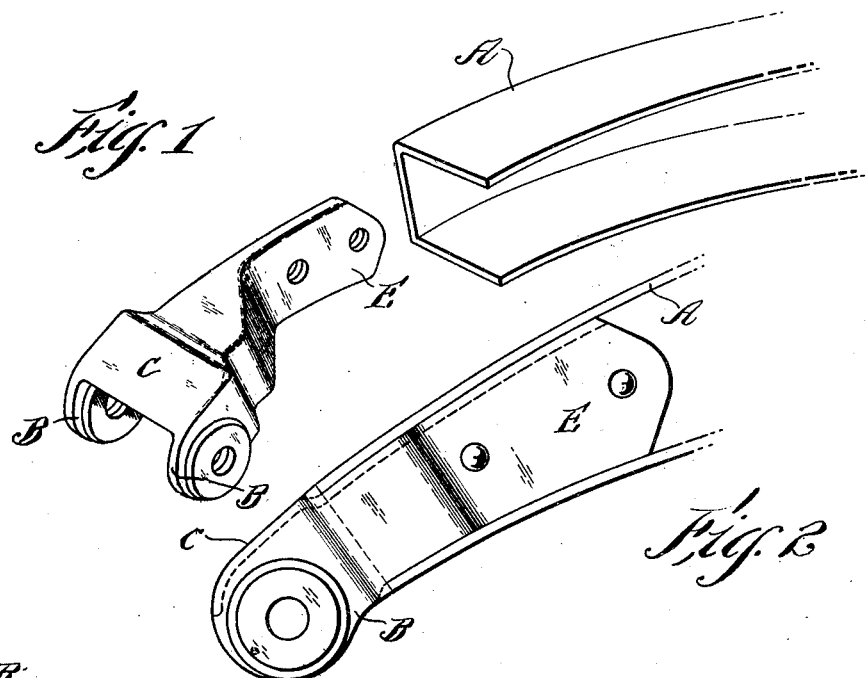
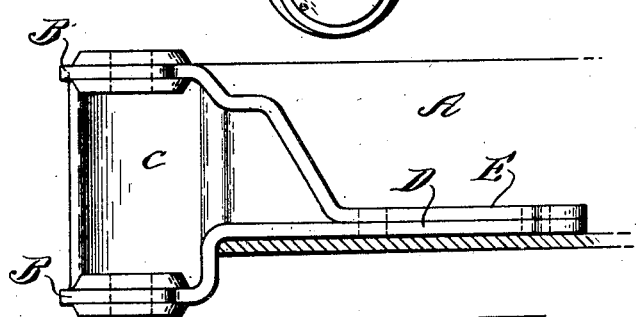
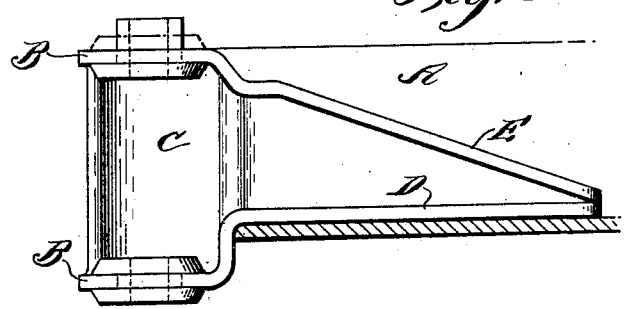
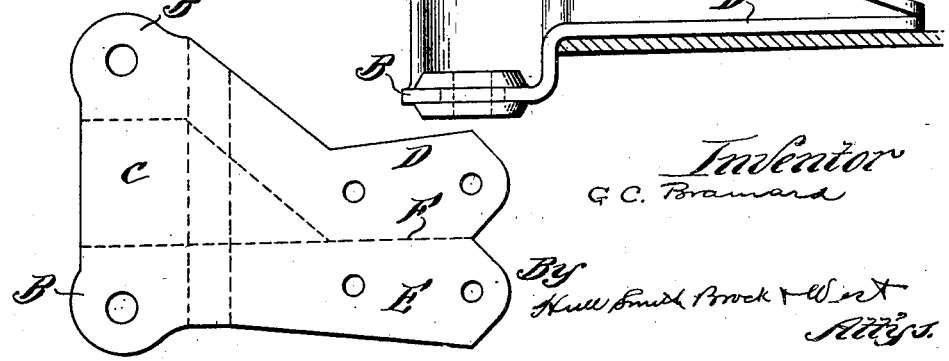

Patented Aug. 26, 1924.

1,506,157

UNITED STATES PATENT OFFICE.

GEORGE C. BRAINARD, OF CLEVELAND, OHIO, ASSIGNOR TO THE HYDRAULIC STEEL COMPANY, OF CLEVELAND, OHIO, A CORPORATION OF OHIO.

PRESSED-STEEL SPRING HANGER FOR AUTOMOBILE FRAMES.

Substitute for application Serial No. 287,281, filed April 3, 1919. This application filed May 27, 1921. Serial No. 473,053.

*To all whom it may concern:*

Be it known that I, GEORGE C. BRAINARD, a citizen of the United States, residing at Cleveland, in the county of Cuyahoga and State of Ohio, have invented a certain new and useful Improvement in Pressed-Steel Spring Hangers for Automobile Frames, of which the following is a full, clear, and exact description, reference being had to the accompanying drawings.

This application is a substitute of my application No. 287,281, filed April 3, 1919.

This invention relates generally to automobile frames and more particularly to a spring hanger at the end of said frame.

Heretofore spring hangers have been made in the form of a casting or forging which has been riveted or bolted to the end of the sheet metal automobile frame. These castings are somewhat expensive and require considerable machine work to be done thereon, both before, and after attachment to the automobile frame end.

The object of my invention is to provide a pressed steel hanger which can be quickly and inexpensively manufactured and also quickly and easily connected to the automobile frame and which when the connection has been completed will have the appearance of an integral portion and in fact will be an integral portion of the automobile frame.

With this object in view the invention consists in the novel features of construction and the manner of combining or arranging the same all of which will be fully described hereinafter and set forth in the appended claims.

In the drawings forming a part of this specification, Fig. 1 is a perspective view of a spring-hanger, constructed in accordance with my invention and separated from the end of an automobile frame; Fig. 2 is a side elevation of the hanger attached to the frame; Fig. 3 is a bottom plan of same; Fig. 4 is a view of the blank from which said hanger is made; and Fig. 5 shows a slight modification of the manner of connecting the hanger to the frame end.

Referring to the drawings A indicates one end of one member of the automobile frame, said frames being usually constructed of channeled steel and which are preferably, though not necessarily, made tapering toward the end. My improved construction of spring hanger is shown at the end of the frame member, this hanger comprising the ears B between which the eye of the spring is inserted and through which the connecting bolt is passed. These ears B are united by an integral connecting member C which is of substantially the same width as the top portion of the frame member and when the hanger is inserted in the channeled end of the frame member one edge of this connecting member of the hanger will contact with the extreme end of the frame member and is connected thereto by welding. The ends of the ears are also connected to the contacting ends of the frame member.

For the purpose of uniting the spring hanger to the frame member, the ears and connecting member are formed with integral wing extensions D and E which are folded along the line F providing a combination brace and attaching member, rivets or bolts being passed through the combined wings D and E when they are folded together, and these wings are of such size and shape as to fit snugly within the channeled end of the frame member and contact with one side thereof, providing a convenient point of attachment for the rivets or bolts.

The hanger as before stated is pressed from a single piece of sheet steel which is first blanked and then folded and the ears can be provided with reenforcements upon either or both sides in order to provide firm bearings for the connecting bolt and also means for accurately positioning the spring eye with the bushing therein. These reenforcements can be welded to the opposite faces of the ears or a wide rivet can be headed down upon each ear and then bored centrally.

In Fig. 5 I have shown a slightly modified form of hanger so far as the mode of attachment is concerned inasmuch as the wings D and E are not brought together but permitted to remain divergent and the edges of said wings welded to the frame member. In this construction no bolts or rivets will be employed, the connection between the hanger and the frame being effected entirely by means of welds. After the contacting portions of the hanger and frame have been welded together along the edges of the connecting member and ears, the weld is smoothed off thereby providing a perfectly smooth finish and when this operation is completed the end of the frame will have the appearance of having a hanger formed integral therewith and inasmuch as the frame is made of sheet metal and the hanger also of sheet metal it is obvious that when these two parts are welded together the frame and hanger will in reality be integral.

A spring hanger constructed as herein shown and described will be much lighter than the hangers now in use and can be manufactured much cheaper and when connected to the frame end will constitute an integral part of said frame.

It is obvious that certain changes and modifications in the shapes and sizes of the wings and connecting members may be required in order to accommodate different shapes of frame ends, but so far as the essentials are concerned, they will be the same in all instances.

Having thus described my invention, what I claim is:

1. A spring hanger for automobile frames comprising parallel ears and a connecting member integral therewith and converging wing members integral with the ears and connecting member and forming a channel therewith and adapted to be connected to the end of an automobile frame.

2. A pressed steel spring hanger for automobile frames comprising parallel apertured ears, an integral connecting member, and integral wing members folded together and adapted to be connected to the end of an automobile frame.

3. A spring hanger for automobile frames comprising a pair of parallel ears and integral wing members shaped for attachment to the end of an automobile frame, said wing members being folded one upon the other and adapted to be connected to the vertical flange of said frame, and said hanger and frame end being welded together.

In testimony whereof, I hereunto affix my signature.

GEORGE C. BRAINARD.